(12) United States Patent
Rubenczyk

(10) Patent No.: US 11,244,014 B2
(45) Date of Patent: Feb. 8, 2022

(54) SYSTEM AND METHOD FOR ENHANCING EXPLORATION OF DATA ITEMS

(71) Applicant: Tal Rubenczyk, Herzliya (IL)

(72) Inventor: Tal Rubenczyk, Herzliya (IL)

( * ) Notice: Subject to any disclaimer, the term of this patent is extended or adjusted under 35 U.S.C. 154(b) by 803 days.

(21) Appl. No.: 14/859,376

(22) Filed: Sep. 21, 2015

(65) Prior Publication Data

US 2016/0098404 A1 Apr. 7, 2016

Related U.S. Application Data

(60) Provisional application No. 62/058,363, filed on Oct. 1, 2014.

(51) Int. Cl.
*G06F 16/9535* (2019.01)

(52) U.S. Cl.
CPC .............................. *G06F 16/9535* (2019.01)

(58) Field of Classification Search
CPC ........... G06F 17/30867; G06F 16/9535; G06F 16/953; G06F 16/285
See application file for complete search history.

(56) References Cited

U.S. PATENT DOCUMENTS

| | | | | |
|---|---|---|---|---|
| 2006/0010029 A1* | 1/2006 | Gross | | 705/10 |
| 2006/0020614 A1* | 1/2006 | Kolawa | ........... | G06Q 10/063 |
| 2007/0203872 A1* | 8/2007 | Flinn | ..................... | G06N 5/048 |
| | | | | 706/62 |
| 2007/0239553 A1* | 10/2007 | Lin | .................... | G06Q 30/0242 |
| | | | | 705/14.7 |
| 2008/0071784 A1* | 3/2008 | Hertzog | .................. | G06Q 30/02 |
| 2008/0120292 A1* | 5/2008 | Sundaresan | ........... | G06F 16/355 |
| 2011/0116709 A1* | 5/2011 | Dai | .................... | H04N 1/00278 |
| | | | | 382/164 |
| 2014/0006414 A1* | 1/2014 | Oikonomou | ........ | G06F 16/9537 |
| | | | | 707/748 |
| 2014/0324965 A1* | 10/2014 | Ralston | ................. | H04L 67/306 |
| | | | | 709/204 |
| 2015/0186947 A1* | 7/2015 | Huang | ............... | G06Q 30/0269 |
| | | | | 705/14.66 |

* cited by examiner

*Primary Examiner* — Ashish Thomas
*Assistant Examiner* — Dustin D Eyers
(74) *Attorney, Agent, or Firm* — Mark M. Friedman

(57) ABSTRACT

The subject matter discloses a method for exploring the most relevant data items, or pieces of information from data sources of various forms and sizes, using the accumulated formalized and clustered behavior of previous users combined with an effective analysis and learning system. According to some embodiments, users are presented with data items that may interest them and are encouraged to rank these data items in order to improve the system's suggestions. The system may also pose the user a selection of questions, meant to further discern the user's preferences.

8 Claims, 3 Drawing Sheets

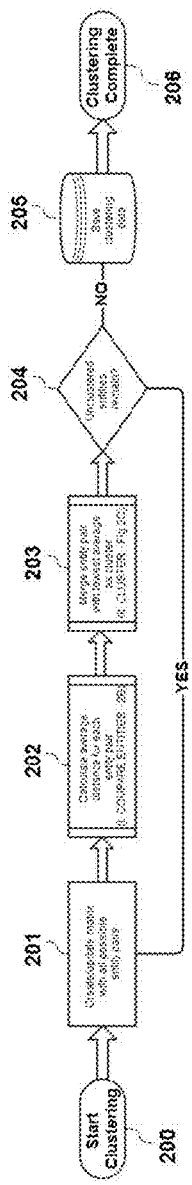
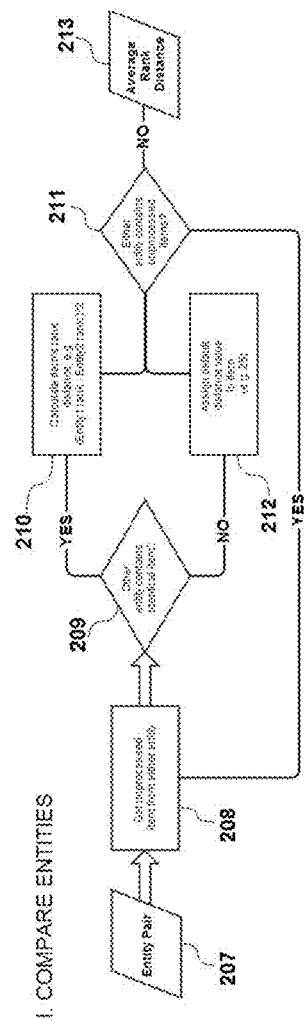
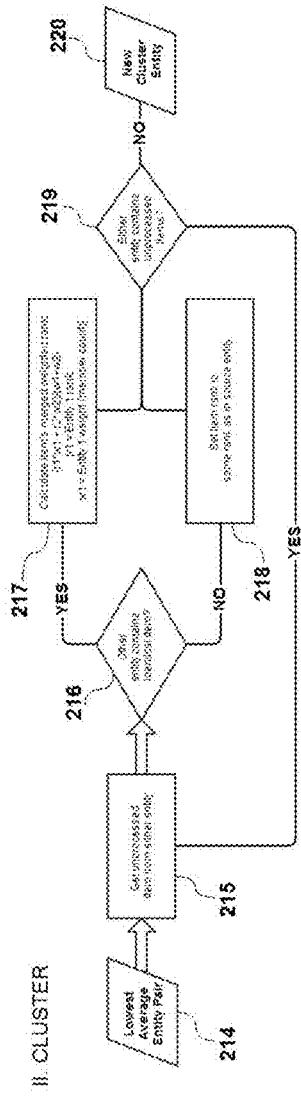
Figure 2A
Figure 2B
Figure 2C

SYSTEM AND METHOD FOR ENHANCING EXPLORATION OF DATA ITEMS

FIELD OF THE INVENTION

The present disclosure relates to the data bases in general, and to enhancing the exploration of data items, in particular.

BACKGROUND OF THE INVENTION

The Internet environment enables users to get access to mass amounts of information, content, products, etc. Existing methods of reaching the most relevant specific subset of information use search engines and/or navigation tools.

When, for example, visiting popular websites that include mass amounts of information such as YouTube, Amazon, iStock Images, etc., the common means of locating content consist of either using a search engine (i.e. formulating a textual description of the requested information), navigation through categories and sub categories, viewing suggested popular items, or getting recommendations based on related items. Recommendations are based on the notion of "people who viewed A also viewed B", and "people who viewed B also viewed C".

SUMMARY OF THE INVENTION

One technical problem dealt with by the present disclosure is how to explore a data source.

While search tools known in the art are typically effective when the user knows how to define what they are looking for, many times this is not the case. Search and navigation require that the users know what they are looking for as well as how to define it. Sometimes users want to explore information without knowing a priori exactly what they are looking for, or without knowing how to define what they are looking for, or to guess in what category it might be.

Known in the art recommendation methods are based on the notion of "people who viewed A also viewed B", and "people who viewed B also viewed C". It assumes that all those who liked "A" will most likely also like "B", and in turn that all those who like "B" will also like "C". In reality, there are people who like "A" as well as "B" and dislike "C", while there are people who like "A" and dislike "B", yet like "C".

Known in the art navigation through categories restrict the grouping of items to one-to-one relationships.

Most existing search means typically present the user with too many options to choose from, for example too many categories, too many results for a search term, etc. It is very common to have a highly relevant piece of information buried in heaps of irrelevant data and never be found.

Embodiments of the invention provide method for exploring the most relevant data items, or pieces of information from data sources of various forms and sizes, using the accumulated formalized and clustered behavior of previous users combined with an effective analysis and learning system. According to some embodiments, users are presented with data items that may interest them and are encouraged to rank these data items in order to improve the system's suggestions. The system may also pose the user a selection of questions, meant to further discern the user's preferences. There is no barrage of information on the user as found in methods known in the art. As the user provides more feedback, every data item or question presented becomes increasingly relevant to them. The more data items (or selection questions) the user ranks, the better the system can analyze his taste, preference (or current mood), associate the user with a specific pre-defined cluster of previous users (based on their rankings) and present increasingly relevant data items—without any need for the user to define what they are looking for.

According to some embodiments the user is presented with an evolving list of data items (referred to as "dynamic item list" hereunder) possibly interlaced with selection questions when necessary, displaying increasingly relevant data items as they go based on the user's feedback.

Such a system provides a better solution compared to navigation through categories since people—and preferences associated with these people—are grouped by division into multi-level clusters. Such a solution provides a better correlation between a selection of a cluster that a person is associated with and the preferences of this person comparing to method known in the art such as navigation through categories.

The term data item refers herein to an entity in a data source. Such entity may include textual data, an image, an audio clip and a video clip. The entity may represent a product, a service, an article, a person or any other data source entity.

The term data source refers herein to an entity that may provide data items such as a database or web service that may or may not reside on the World Wide Web or be installed locally, or take any other form (be it physical or logical). According to some embodiments, visual representation of a data item is determined by the client's implementation, but usually includes the name of the data item, description, multimedia media data such as image or a video and any other available data elements deemed relevant by the client. These data elements may be acquired from the original data source as well as from related external or internal data sources as defined in the system for that client (e.g., external web services, knowledge bases, etc.). The system may increase the frequency of certain data items to be ranked (for example, new data items).

While the system continually learns from users' feedback, an initial training period may be required wherein the system mainly receives feedback from users, usually without affecting the results displayed to the user. In some embodiments, the training period can be eliminated, for example if a priori information about the data items is gathered and utilized. Such a priori information can be gathered, for example, using existing information about relations between data items in the data source, previous users' preferences regarding data items, code installed on the website to fetch relevant user behavior or from any external data source.

According to some embodiments, the system collects user ranking input of data items in a number of different ways, for example:

Users viewing and ranking a data item on a number scale, e.g. between 1 (not interesting) to 10 (very interesting)

Users positioning a slider on a graphic scale

Receiving verbal input from the user

Exposure statistics (i.e. measuring the time spent by the user viewing or interacting with the presented data item)

Any other means of user input

In cases where the system presents more than one data item to be ranked, the system can ask, for example, which data item is more interesting or present the comparison in a graphic format allowing the user to rank the data items internally according to interest, relevance, etc.

According to some embodiments, the system can receive data sources and data items either as a feed (XML, flat file or another designated format of data item data, via push or pull), using code to fetch data items automatically from the client site, using a local data source or by any other means. The data source can include a large quantity of many types of data items (e.g., products, videos, articles, or any other type of presentable information). Each data item can include different attributes such as name, description, image, video, links to other locations, etc. This information (or link to the information) is stored in the system.

The system can get (via push or pull) updated data items and data sources at regular intervals. New data items may be taken into consideration, for example, by being added to the data item collection as unranked data items, while eliminated data items can be removed.

According to some embodiments, a training period is provided. During the training period, a combination of random data items, popular data items from previous site rankings or external rankings, non-ranked data items or data items with fewer rankings are presented to the user as a dynamic item list to be ranked. The system stores the ranking of each user.

Once a sufficient amount of users and ranked data items has been accumulated, the system initiates a clustering process, intended to group users with similar preferences (also referred to as "moods") into clusters. The term distance refers herein to a representation of the gap between preferences of users, preferences of clusters and preferences of users and clusters. For example, one method of calculating distance consists of comparing the sum of the squared differences between rankings of identical data items; for example, a user who has so far ranked 3 data items. The distance from each cluster can be calculated by accumulating the sum of squared differences between each of the 3 user's rankings to the cluster weighted average rankings of each of these data items. The smaller the sum is, the smaller the distance between the user and the cluster is. The level of similarity is inverse to the distance; the smaller the distance, the higher the level of similarity. For example if the distance between the preference of user A and cluster X is 3 while the distance between the preference of user B and cluster X is 4, then the level of similarity between user A and cluster X is higher than the level of similarity between user B and cluster X.

The number of clusters resulting from the clustering process can either be predefined to a specific target or maximal value or decided dynamically according to different criteria. If the clustering is dynamic, a possible criterion could be, for example, the maximum allowed distance between a specific ranker and the cluster closest to them. Once the distance of the closest cluster is greater than this value, a new cluster is created to accommodate this user.

The clustering can be done using an iterative process, initially calculating the distances between each pair of users. The closest pairs are combined to one cluster, and the process is repeated with the new combined cluster acting as a new user entity instead of the individual users, using the weighted average rankings of the users in the cluster as the cluster entity's rankings. A few sets of clusters can be calculated for further optimization of the suggested dynamic item list.

The clustering process may be done in bulk, and can either be run at pre-defined intervals or time periods or be triggered by other events such as a specific amount of users that ranked since last clustering.

The clustering calculation can also take into account change of preference of a user (changing mood). The change of preference may be identified by a significant shift between clusters when calculating the distances of subsequent groups of rankings by the same user. For example, results of rankings of data items 1-5 in the dynamic item list by a certain user may be closer to cluster A, while results of rankings of data items 6-10 in the dynamic item list may be closer to another cluster. In some embodiments, the process of rebuilding the clusters associates the preferences of the user before changing mood to cluster A and the preferences of the user after changing mood to cluster B.

According to some embodiments, distinguishing data items are presented in the dynamic item list to be ranked by the user. The distinguishing data items are characterized by high variance of ranking between different clusters, for example, with the highest variance of all measured clusters. A distinguishing data item may be determined by measuring the variance of rankings of all the data items between the different clusters. Data items with the highest variances are distinguishing data items. These data items can be general distinguishing data items (hereunder "general distinguishing", i.e.), or data items that distinguish between subsets of clusters (hereunder "subset distinguishing"), that is to say, data items that for a specific subset of clusters display the highest ranking variance between those clusters).

In the calculation of distinguishing data items, the weight of the cluster (i.e. the number of users it contains) may also be considered.

Once a user starts using the system, a feedback-based dynamic item list is presented to the user, who is then encouraged to rank the presented data item before reviewing the next item in the dynamic item list.

The dynamic item list is a set of data items optimized for the user (based on their perceived preference or mood). The most common dynamic item list optimization method is explained below, but custom methods can be developed and used as well if necessary, depending on specific client requirements.

If available, the first data items presented may be the highest general distinguishing data items (i.e. the data items that provide the clearest distinction between clusters), or a random selection between few highest general distinguishing data items. Once ranked by the user, the system then calculates the cluster closest to the user (based on the relevant distance calculation as previously explained). Once the closest cluster has been determined, the system presents a set of data items consisting mainly of highly ranked data items from this cluster, but also of data items that have not yet received sufficient rankings within the cluster (e.g., recently added data items and data items with the fewest amount of rankings in this cluster), as well as general distinguishing data items and subset distinguishing data items of a few clusters, preferably clusters that are close to the user's rankings so far.

Although it is assumed that the highest ranked data items from the closest cluster are the most interesting to the user and are therefore presented more frequently within the dynamic item list so that the user will get more relevant data, at the same time the system may interject data items that may help the system learn the user's mood more efficiently as well as improve its clustering (such as the aforementioned rarely-ranked and distinguishing data items). In some embodiments, it may also be possible for the system to present users with predetermined questions (from an internal or external data source, and not necessarily from the data source to be explored) that are deemed to be distinguishing questions, with the aim of pinpointing the user's cluster or mood as quickly as possible. After every pre-defined number of data items presented (or based on other predetermined criteria), the system dynamically recalculates the cluster closest to the user and continues presenting the dynamic item list based on the methodology above.

In some embodiments, data items in the dynamic item list are presented one at a time and the ranking assigned to the data item is an absolute rank on the predefined scale. In some other embodiments calling for more than one data item to be displayed, the internal ranking within the displayed group is normalized to the predefined ranking scale. In some other embodiments two or more data items are displayed to the user and the user is requested to select any number of relevant data items out of the group. Based on the selections, the system attributes a numeric rank to each of the data items. For example, if one data item is selected over the other, it will be assigned a rank of 10 and the other data item will be assigned a rank of 1.

According to some embodiments, the system can also be applied to a subset of the data items in the data source, such as in the case of a search query or browsing filter. In such a case, only data items present in the relevant subset are taken into account in all the above mentioned methodologies.

According to some embodiments, the system has several sets of clusters, for example a set that divides the users into 10 clusters, into 100 clusters and into 1000 clusters. The distances of users' rankings can be calculated using a different cluster set, based on defined parameters such as number of rankings so far, distance from clusters, etc. There is also the option of creating mood clusters, that is to say, clusters that take a user's mood into account. The mood clusters may be generated in addition to the normal clusters, whose data items can be presented along with data items from the regular clusters when attempting to determine, based on user feedback, if a user's current selections are due to general preference or a specific current mood.

The system can monitor positive user interaction, such as: clicking on a certain link (such as "view more"); purchasing a product; time spent reviewing a data item, etc. The system may increase the weight of the ranks of a user that performed such an interaction, under the assumption that such a user's input is more valuable.

It should be noted that the clustering and distance calculation methods outlined above are only examples of the basic implementation. Other methods can be used for clustering (in addition to or instead of the iterative method described above) and distance calculation (complementing or replacing the use of the sum of squared differences).

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 2a shows a general block diagram of a back end clustering process, in accordance with some exemplary embodiments of the disclosed subject matter;

FIG. 2b shows a general block diagram of a process of calculating level of similarity as part of the back end clustering process, in accordance with some exemplary embodiments of the disclosed subject matter;

FIG. 2c shows a general block diagram of a creating a cluster as part of the back end clustering process, in accordance with some exemplary embodiments of the disclosed subject matter.

DETAILED DESCRIPTION

Figure 1:
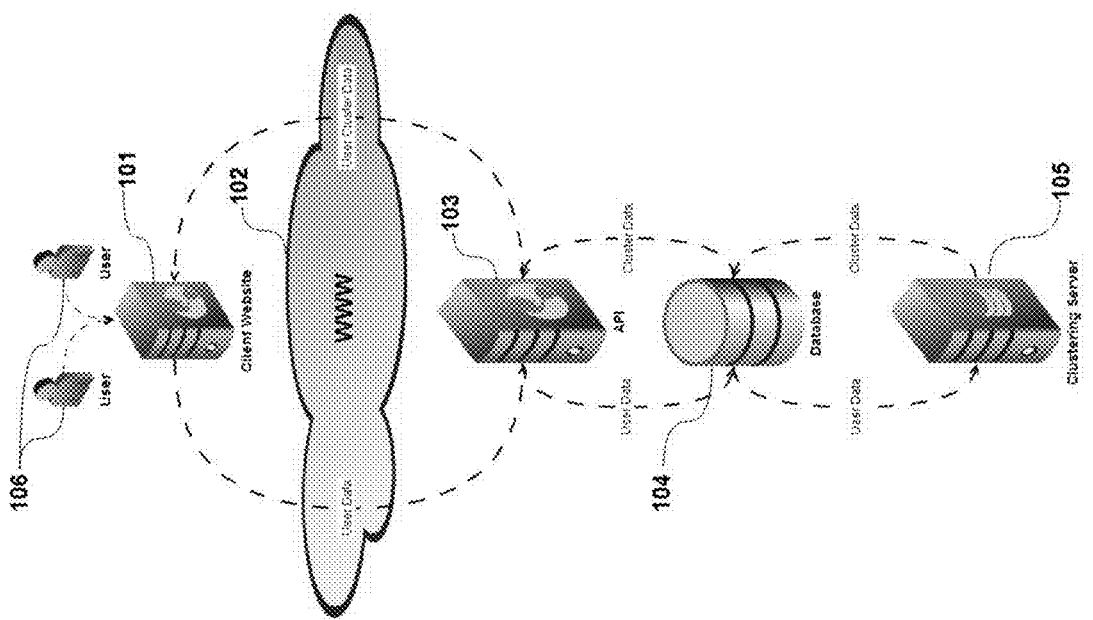
FIG. 1 shows a system for enhancing exploration of data items, in accordance with some exemplary embodiments of the subject matter.

FIG. 1 shows a system for enhancing exploration of data items in accordance with some exemplary embodiments of the subject matter.

System 100 includes client website server 101, API server 103, data base 104, clustering server 105 and users computer devices 106.

The client website server 101 is configured for communicating with the plurality of user's computer devices 106. The communication may be via the web cloud 102. The plurality of users' computer devices 106 may be connected to the client website server 101 for displaying to the user recommendation about data items of other users with similar preference. The plurality of users' computer devices 106 may also be connected to the client website server for querying users about their preferences. The plurality of user may be associated with clusters according to level of similarity of their preferences. The communication of the client website server 101 with the users' computer devices 106 is, inter alia, for recommending data items to the users and for collecting the preferences of the users. The client website server 101 communicates with the API server 103 via the web cloud 102 for transferring data from the data base 104 to the users' computer devices 106 and vice versa.

The API server 103 is configured for performing the communication between the client website server 101 and the data base 104 by utilizing API (Application program interface). An example of such API is the RESTful Application Program Interface. The API server 103 is also configured for associating new users to existing clusters. A new user is associated with a cluster according to his preferences to list of data items that are presented to him. Once the user is associated with a cluster, the system presents to the user data items from this cluster. Typically, the user is presented with the data items that have the higher rank. The API server 103 may check the association of existing user to the cluster from time to time in order to detect changes in preferences. The check may be done by presenting to the user data items from other clusters.

The data base 104 is configured for storing data items that are received from the client website server 101. Such data items may be, for example, an image, a video clip and text. Such data items may represent products or services. The data base 104 is also configured for storing the details about the users, the preferences of the users and details about the clusters. Such details about the clusters may include the identification of the cluster, the users and the data items that are associated with the cluster, the ranks per each data item in the cluster, the average rank, etc.

The clustering server 105 is configured for generating the clusters according to preferences of the users such that each cluster includes the users that have the closest preferences to the items that are associated with the cluster.

FIG. 2a shows a general block diagram of a typical back end clustering process in accordance with some exemplary embodiments of the disclosed subject matter.

According to some embodiments, the backend process is configured for building clusters. According to some embodiments, the process is performed at initialization for generating the new clusters, and then from time to time in order to recalculate the clusters. The recalculation takes into account the changes in preferences of existing users, the preferences of new users and any new data items. Such a process generates a cluster of users with similar preferences and associates data items that were ranked by these users to the cluster.

Referring now to the drawings:

At block 200, the process starts. The process may be started at initialization of the system, or from time to time, for example, every few days.

At block 201, a matrix of all options of pairs of users and/or clusters is generated. At the first operation of block 201, the matrix includes all the possible pairs of users. For example if the system includes users A, B, C and D, a matrix of the pairs AB, AC, AD, BC, BD and CD is generated. After the first operation, the system includes at least one cluster and thus, the matrix that is generated includes all options of pairs of users and the at least one cluster. For example if the system includes users A, B, and cluster X that includes users C and D, a matrix of the pairs AB, AX and BX is generated Per each user, the matrix includes identification of the user and the preferences of all the data items that have been presented to the user. Per each cluster, the matrix includes identification of the cluster, the list of users in the cluster, the average preference of all the users in the cluster for all the data items that are associated with these users and the average preference per each data item that is associated with the cluster.

At block 202, the average preference (level of similarity of preferences of the data items) for each pair is calculated. The calculation is explained in greater details in FIG. 2b.

At block 203, a cluster is created. The cluster includes the pair that has the highest level of similarity. For example if the pair AX is the pair with the highest level of similarity then a new cluster that is comprised of user A and old cluster X is generated. The highest level of similarity may be the determined by the smallest calculated distance. The process of generating the cluster is explained in greater detail in FIG. 2c. In some embodiments, if there are two or more pairs with higher level of similarity only one pair is chosen.

At block 204, a check is performed to identify users that are not yet associated with clusters. If there are such users then the process continues at block 201; otherwise the data associated with the generated clusters is saved at block 205 and the process is terminated at block 206.

FIG. 2b shows a general block diagram of a process for calculating level of similarity as part of the back end clustering process, in accordance with some embodiments of the disclosed subject matter.

According to some embodiments, the level of similarity of preferences is calculated for each pair wherein the pair includes two users or a user and a cluster or two clusters. The distance is calculated for finding out the pair with the highest level of similarity for identifying this pair as a cluster. Referring now to the drawing:

At block 207 the process starts.

At block 208, a data item (for example, a product) that has been ranked by a member of the pair is selected.

At block 209, a check is performed to identify if the data item has also been ranked by the second member of the pair.

If the answer to the check is positive then at block 210 the average rank for this data item is calculated. An example of such calculation may be the square of the differences between the two ranks.

If the answer to the check is negative then at block 212 the average rank of this data item is set to a predefined value (for example 25).

At block 211, a check is performed to identify if there are data items associated with the members of the pair that have not been processed yet. If the answer is positive, then the process continues at block 208; otherwise (all items have been processed), at block 213 the level of similarity is calculated. In one example, the level of similarity is calculated by averaging all of the average ranks for all data items that are associated with this pair.

FIG. 2c shows a general block diagram of a process for creating a cluster as part of the back end clustering process, in accordance with some exemplary embodiments of the disclosed subject matter.

At block 214 the process starts by selecting the pair with the highest similarity of preferences, this pair is identified as the new generated cluster.

At block 215, a data item (for example, a product) that has been ranked by a member of the new generated cluster is selected.

At block 216, a check is performed to identify if the data item has also been ranked by the other member of the cluster. If the response to the check is positive then at block 217, the average rank for this cluster is calculated. The average rank of the cluster for the item may be calculated by, first, determining a weight per each member in the pair. If the member of the pair is a single user then the weight is determined as 1, if the member of the pair is a cluster then the weight is determined as the number of users in this cluster that have ranked the data item in question. These weights can then be used to determine the weighted average rank of this item, which can in turn be assigned as the item's rank within the new cluster.

If the answer to the check is negative, then at 218 the data item retains same rank and weight in the new cluster as in the entity from which the rank originated. For example, if user A is being merged into cluster X, and an item which has not been ranked by user A has been ranked by 3 users in cluster X with an average rank of 7, then the rank of the item in new cluster AX will remain 7 with a weight of 3.

At block 219, a check is performed to identify if there are data items associated with the members of the pair that have not been ranked yet. If the answer is positive, so then the process continues at block 215; otherwise (all the items have been ranked), at block 220, the process for generating a new cluster is ended.

Figure 3:
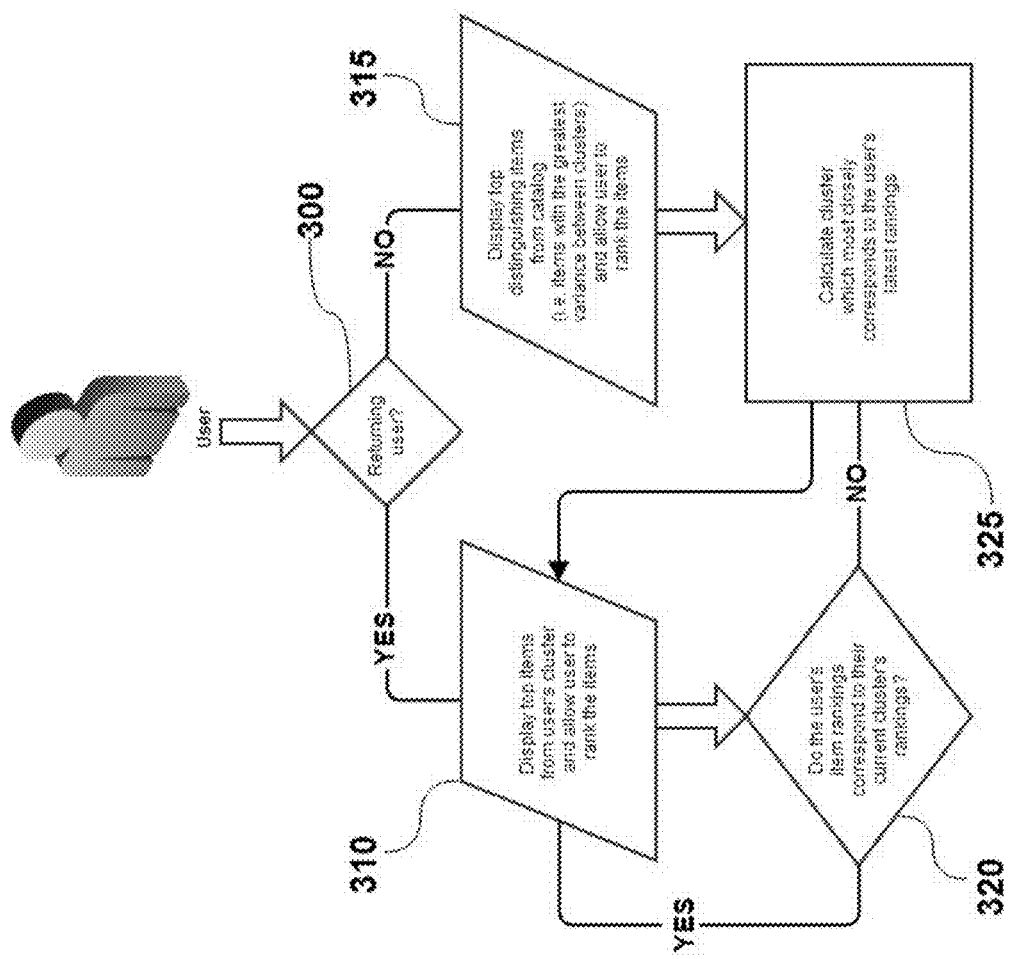
FIG. 3 shows a flowchart diagram of a typical front end clustering process, in accordance with some exemplary embodiments of the disclosed subject matter.

FIG. 3 shows a flowchart diagram of a typical front end clustering process, in accordance with some exemplary embodiments of the disclosed subject matter.

According to some embodiment, the front end clustering process is an on-line process that temporarily associates a new user to a cluster. The front end clustering process may also check if there is a change in the preferences of an existing user. The front end clustering process may also offer new data items to the user. Referring now to the drawing:

At block 300, a check is performed to identify the user.

Blocks 310, 320 and optionally 325 are performed if the user is an existing user At block 310, highly ranked items (most popular) from the cluster that the user is associated with are presented to the user. The user is requested to rank these data items. The user may also be offered to purchase or otherwise interact with the data items.

At block 320, the ranks of the user are compared to the clusters' average rank of the data items. If the variance between the user's rank and the cluster average rank is greater than a threshold then the operation is transferred to block 325 for associating the user to a new cluster; otherwise operation continues at block 310 for offering this user more data items from the cluster that the user is associated with.

Blocks 315 and 325 are performed if the user is a new user. At block 315, distinguishing data items are displayed to the user. The user is requested to rank these data items.

At block 325, a cluster is associated with the user according to his recent ranks. The associated cluster is the cluster whose average preference of the products that the user has recently ranked is the most closest to the preferences of this user.

It should be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A method; the method comprises:
receiving by a first server a plurality of ranks of a plurality of data items; wherein said plurality of ranks being ranked by a plurality of first users;
calculating by said first server a plurality of clusters; wherein each of said plurality of clusters comprises ranks of a subset of users from said plurality of first users and a subset of data items from said plurality of data items; wherein data items of said subset of data items being ranked by at least one first user from said subset of first users; wherein said calculating determining said subset of users and said subset of data items in accordance with level of similarity of preference for said subset of data items by said subset of users;
for each data item associated with each cluster from said clusters, averaging, by a second server, preference among said subset of users of said cluster; to, thereby determining cluster-average-preference for said each data item of said each cluster;
measuring, by said second server, a variance of said cluster-average-preference for each of said data items, said variance being among said clusters;
presenting, by second server, to a new user a distinguishing data item from said data items whose variance of cluster-average preference is highest among said data items;
receiving, by said second server, from said new user a first preference for said distinguishing data item;
comparing, by said second user, said first preference of said distinguished data item whose variance of cluster-average preference is highest among said data items with said cluster-average preference of said distinguishing data item associated with each of an at least subset of said plurality of clusters; and
associating, by said second server, said new user with a first cluster from said at least subset whose cluster-average preference associated with said distinguishing data item is the closest, in accordance with said comparing, to said first preference of said distinguish data item.

2. The method of claim 1, further comprising displaying to a user rarely ranks data items for associating said rarely ranked data items to a cluster.

3. The method of claim 1, wherein said distinguishing data item being from external data source.

4. The method of claim 2, wherein said rarely ranked data item being from external data source.

5. The method of claim 1, further comprises presenting of an at least one data item from said subset of data items on a computer device of an at least one user from said subset of users wherein said at least one data item being highly ranked by said subset of users.

6. The method of claim 1, further comprising causing the presenting of a plurality of data items from said subset of data items on said computer device for selecting one data item from said presented data items.

7. The method of claim 1, wherein said calculating further comprising iteratively pairing users or clusters, calculating the level of preference between said pairs and determining a pair with the highest level of similarity from said pairs as a new cluster.

8. The method of claim 1, wherein determining said level of similarity of preference of each of said subset of data items by said subset of users comprises determining a weight per each user in said subset of users, wherein said rank is corresponding to number of said subset of users.

* * * * *